United States Patent [19]
Higashiyama et al.

[11] Patent Number: 6,117,905
[45] Date of Patent: Sep. 12, 2000

[54] EDIBLE OIL CONTAINING ARACHIDONIC ACID AND FOODS CONTAINING THE SAME

[75] Inventors: Kenichi Higashiyama, Mishima-Gun; Kengo Akimoto, Osaka; Sakayu Shimizu, Kyoto; Nobushige Doisaki; Kiyomi Furihata, both of Hachioji, all of Japan

[73] Assignees: Suntory Limited, Osaka; Nippon Suisan Kaisha, Ltd., Tokyo, both of Japan

[21] Appl. No.: 09/284,205

[22] PCT Filed: Oct. 9, 1997

[86] PCT No.: PCT/JP97/03631

§ 371 Date: Jun. 29, 1999

§ 102(e) Date: Jun. 29, 1999

[87] PCT Pub. No.: WO98/16119

PCT Pub. Date: Apr. 23, 1998

[30] Foreign Application Priority Data

Oct. 11, 1996 [JP] Japan ..................... 8-289172

[51] Int. Cl.⁷ .................................................. A61K 31/20
[52] U.S. Cl. ............................................................ 514/560
[58] Field of Search ............................................... 514/560

[56] References Cited

U.S. PATENT DOCUMENTS 5,204,250 4/1993 Shinmen et al. .

FOREIGN PATENT DOCUMENTS

| 0 223 960 A2 | 6/1987 | European Pat. Off. . |
| 0 726 321 A2 | 8/1996 | European Pat. Off. . |
| 63-116643 | 5/1988 | Japan . |
| 1-196255 | 8/1989 | Japan . |
| 1-304892 | 12/1989 | Japan . |
| 3-272692 | 12/1991 | Japan . |
| 6-172263 | 6/1994 | Japan . |
| WO 92/13086 | 8/1992 | WIPO . |
| WO 94/28913 | 12/1994 | WIPO . |

OTHER PUBLICATIONS

*Production and Utilization of Polyunsaturated Fatty Acids*, New Food Industry 1995 vol. 37 No. 9, pp. 1–9. Also includes English translation, pp 1–5.

*Occurence of a Novel Sterol, 24,25–Methylenecholest–5–en–3β–ol, in Mortierella alpina 1S–4*, Sakayu Shimizu et al., LIPIDS, vol. 27, No. 6 (1992), pp. 481–483.

*Neurological differences between 9–year–old children fed breast–milk or formula–milk as babies*, C.I. Lanting et al., The Lancet, vol. 344, Nov. 12, 1994, pp. 1319–1322.

*Primary Examiner*—Rebecca Cook
*Attorney, Agent, or Firm*—Armstrong, Westerman, Hattori, McLeland & Naughton

[57] ABSTRACT

Edible oil containing arachidonic acid obtained from microorganisms belonging to the subgenus Mortierella of the genus Mortierella and being capable of producing arachidonic acid are provided. The oil contain little unsaponifiable matters and, above all, the smallest possible amount of sterol with cyclopropane structure which have not been recognized as food components, and are suitable for the production of foods, in particular, infant formula.

Arachidonic acid-containing edible oil originating in microorganisms containing not more than 0.8% by weight, preferably not more than 0.6% by weight of unsaponifiable matters and 20% by weight or more of arachidonic acid. Further, these edible oil contain not more than 0.3% by weight, preferably not more than 0.15% by weight of 24,25-methylenecholest-5-en-3 β-ol. The microorganisms are those belonging to the subgenus Mortierella of the genus Mortierella and being capable of producing arachidonic acid. These microorganisms belong to the species *alpine* of the genus Mortierella. Foods including the arachidonic acid-containing edible oil. Formula for premature infants, formula for infants, foods for infants, and foods for pregnant women and nursing mothers, including the arachidonic acid-containing edible oil.

5 Claims, No Drawings

EDIBLE OIL CONTAINING ARACHIDONIC ACID AND FOODS CONTAINING THE SAME

This is a 371 of PCT/JP97/03631 filed Oct. 9, 1997.

TECHNICAL FIELD

This invention relates to edible oil that contains arachidonic acid obtained from microorganisms belonging to the subgenus Mortierella of the genus Mortierella and being capable of producing arachidonic acid, but contains little unsaponifiable matters. This invention also relates to foods containing the arachidonic acid-containing edible oil, in particular, infant formula.

In this invention, "unsaponifiable matters" means that originating in microorganisms. Therefore the term "unsaponifiable matters" in this description indicates only that originating in microorganisms and being free of that added artificially.

BACKGROUND ART

Arachidonic acid has attracted attention as a precursor of prostaglandins, thromboxane, prostacyclin, leucotrienes, etc. which have potent and various physiological actions including uterine muscle contraction, relaxation, vasodilatation, and antihypertensive action. Along with DHA (docosahexaenoic acid), it has extensively and intensively been investigated particularly as a substance essential for growth of infants. For example, Lanting et al. followed up the growth of infants until the age of 9 years who had been fed with mother's milk or milk powder for infants for more than 3 weeks after birth, investigated the incidence of minor impairments in the cranial nerve in these infants based on their behavior, etc, and found that the incidence of encephalopathy in the infants fed with milk powder for infants was about twice as high as that in those fed with mother's milk [LANCET, Vol.344, 1319–1322 (1994)]. This shocking fact is supposed to have been due to the lack of long-chain unsaturated fatty acids such as DHA and arachidonic acid in milk powder for infants while these acids are present in mother's milk, which acids may play an important role in development of the brain. Many studies have been done to make milk powder for infants resemble as closely as possible to mother's milk, the ideal nutrition for infants, though these studies have concentrated on elucidation of the relationship between the basic nutrients, vitamins, minerals, etc. present in mother's milk and the infection-preventing action of mother's milk. Lately the influence of long-chain poly-unsaturated fatty acids on the brain has also become of interest. Further, reports indicating that long-chain unsaturated fatty acids may play a role in development of the brain and the retina of newborns have recently been published one after another. This raises topics attracting attentions in the field of nutrition of premature infants and newborns. Thus it has been desired to develop oil containing arachidonic acid abundantly and being safely usable as ingredients of foods, in particular, infant formula.

Arachidonic acid occurs widely in the animal kingdoms, and has been isolated from lipids extracted from the adrenal gland and the liver of animals. However, because such organs contain the acid only a little and a large amount of the organs are hardly obtainable, isolation from these organs is insufficient for supply of arachidonic acid. Methods have been proposed to produce arachidonic acid by cultivation of various microorganisms capable of producing arachidonic acid. Among them those belonging to the genus Mortierella have been known to produce oil with a high content of arachidonic acid (Japanese Published Unexamined Patent Application No. 44891/88 and No. 12290/88). Although the oil thus produced are said to be highly safe, it is not widely accepted because of its originating in microorganisms. The oil obtained by cultivation of the microorganisms belonging to the species *Mortierella alpine* comprises mainly triglycerides (about 70% by weight or more) and phospholipids together with unsaponifiable matters including desmosterol. It is confirmed that sterol with cyclopropane structure which have never been known to occur in nature, in the concrete, 24,25-methylenecholest-5-en-3 β-ol are contained among the unsaponifiable matters [LIPIDS, Vol.27, No.6, 481–483 (1992)], though all of the composition of the unsaponifiable matters in the oil is not known.

DISCLOSURE OF THE INVENTION

The inventors thought it desirable at present to remove as far as possible those substances, which have not been recognized as food components or of which structures remain unknown, from the arachidonic acid-containing oil obtained by cultivation of microorganisms belonging to the subgenus Mortierella of the genus Mortierella. Therefore this invention intends to provide edible oil containing arachidonic acid originating in microorganisms belonging to the subgenus Mortierella of the genus Mortierella, containing little unsaponifiable matters and, above all, the smallest possible amount of sterol with cyclopropane structure which have never been eaten, and being suitable for production of foods, in particular, infant formula.

The inventors have found it possible to reduce the content of 24,25-methylenecholest-5-en-3 β-ol in the arachidonic acid-containing oil obtained from the culture of arachidonic acid-producing microorganisms belonging to the genus Mortierella by controlling the conditions of cultivation. This finding has given the inventors a new purpose for production of arachidonic acid-containing oil with a smallest possible amount of substances which have not been recognized as food components or of which structures remain unknown. Then the inventors have found, as the result of many researches to achieve the above purpose, that it is possible to reduce the content of unsaponifiable matters and the substances including sterol with cyclopropane structure which have not been recognized as food components or of which structures remain unknown without any influence on the content of arachidonic acid, by cultivating arachidonic acid-producing microorganisms belonging to the subgenus Mortierella of the genus Mortierella in nutrient medium according to the conventional method, collecting the microbes, recovering oil abundant in arachidonic acid from the microbes, and refining the oil by an appropriate combination of conventional processes for edible oils and fats, such as degumming, treatment with alkali, bleaching, deodorization, etc. Eventually the inventors have completed this invention.

Hence this invention relates to arachidonic acid-containing edible oil originating in microorganisms which contain not more than 0.8% by weight of unsaponifiable matters and 20% by weight or more of arachidonic acid.

In addition, this invention relates to arachidonic acid-containing edible oil originating in microorganisms which contain not more than 0.6% by weight of unsaponifiable matters and 20% by weight or more of arachidonic acid.

Further, this invention relates to arachidonic acid-containing edible oil originating in microorganisms which contain not more than 0.8% by weight, preferably not more than 0.6% by weight, of unsaponifiable matters, 20% by weight or more of arachidonic acid, and not more than 0.3% by weight, preferably not more than 0.15% by weight, of 24,25-methylenecholest-5-en-3 β-ol.

Furthermore, this invention relates to foods such as formula for premature infants, infant formula, foods for infants, and foods for pregnant women and nursing mothers, containing any of the above-mentioned edible oil.

The oil of this invention are oil of microorganisms origin obtained from the culture after cultivation of arachidonic acid-producing microorganisms belonging to the subgenus Mortierella of the genus Mortierella, containing not more than 0.8% by weight, preferably not more than 0.6% by weight, more preferably not more than 0.5% by weight, of unsaponifiable matters based on the weight of the oil, and 20% by weight or more, preferably 30% by weight or more, more preferably 35% by weight or more, of arachidonic acid based on the weight of the total fatty acid in the oil.

It is preferable that the oil of this invention contain not more than 0.3% by weight, preferably not more than 0.15% by weight, more preferably not more than 0.04% by weight, of 24,25-methylenecholest-5-en-3 β-ol.

It is also preferable that the oil of this invention contain 70% by weight or more, preferably 90% by weight or more, more preferably 92% by weight or more, of triglycerides in the oil.

It is preferable that the oil of this invention contain not more than 0.1% of moisture, have the acid value of 0.5 or less and peroxide value of 5 or less, show a color of 50 or less of yellow and 10 or less of red as determined in a 133.4 mm cell by the Rovibond's method, and contain 0.2 to 0.7% myristic acid, 10 to 16% of palmitic acid, 4 to 10% of stearic acid, 5 to 15% of oleic acid, 5 to 15% of linoleic acid, 1 to 5% of γ-linolenic acid, 0.1 to 2% of α-linolenic acid, 1 to 6% of dihomo-γ-linolenic acid, 0 to 1% of eicosapentaenoic acid, and 2 to 7% of lignoceric acid.

The microorganisms used for production of the oil of this invention belong to the subgenus Mortierella of the genus Mortierella, and any of those may be used as far as they are able to produce arachidonic acid. The microorganisms are exemplified by *Mortiorella elongate* IFO 8570, *Mortierella exigua* IFO 8571, *Morticrella hygrophila* IFO 5941, *Mortierella alpina* IFO 8568, ATCC 16266, ATCC 32221, ATCC 42430, CBS 219.35, CBS 224.37, CBS 250.53, CBS 343.66, CBS 527.72, CBS 529.72, CBS 528.72, CBS 608.70, CBS 754.68, and the like. These strains are available without any limitation from the Foundation Institute of Fermentation in Osaka (IFO), American Type Culture Collection (ATCC), and Centraalbureau voor Schimmelcultures (CBS). Also the strain isolated by the inventors from soil, *Mortierella elongate* SAM 0219 [National Institute of Bioscience and Human-Technology Agency of Industrial Science and Technology, Ministry of International Trade and Industry, 1-3, Higashi 1-Chome, Tsukuba-shi, Ibaragi-ken, Japan, deposited on Mar. 19, 1986, Accession No.FERM BP-12391] may be used. The strains belonging to these type cultures or isolated from the natural world are usable as they are, and spontaneous variants may be used which are obtained by one or more repetitions of growth and/or isolation of the original strains and have different properties from those of the original strains.

The microorganisms used in this invention also include the variants and recombinants of the arachidonic acid-producing microorganisms belonging to the subgenus Mortierella of the genus Mortierella (wild strains), i.e. those designed so that the content of arachidonic acid in the oil may be increased and/or the content of the total oil may be increased over that produced by the microorganisms of the original wild strain when cultivated by using the same substrates. The microorganisms of this invention further include those designed so that they may utilize efficiently the substrates with high cost-benefit ratios to produce arachidonic acid as much as obtainable with the corresponding wild strains.

Microorganisms capable of producing arachidonic acid can be cultivated according to the conventional methods. For example, the spore, mycelium, or preculture obtained by preliminary cultivation of the microorganism strain is inoculated into a common liquid or solid medium followed by cultivation. When a liquid medium is used, common carbon sources including glucose, fructose, xylose, saccharose, maltose, soluble starch, refinery molasses, glycerol, mannitol, citric acid, and corn starch may be used, among which glucose, fructose, maltose, glycerol, citric acid, and corn starch are particularly preferable. Usable nitrogen sources are organic nitrogen sources such as peptone, yeast extract, malt extract, meat extract, casamino acids, corn steep liquor, and urea, and inorganic nitrogen sources such as sodium nitrate, ammonium nitrate, and ammonium sulfate.

Use of a nutrient source derived from soybean as the nitrogen source can reduce the content of 24,25-methylenecholest-5-en-3 β-ol in the oil (the ratio based on the total sterol in the oil). It is preferable that the nitrogen source obtained from soybean, being usable in this invention, contains 2% or more, preferably 3% or more, more preferably 5% or more, of nitrogen based on the ingredients other than moisture. Usable nitrogen sources from soybean include defatted soybean without any further treatment or after processing such as heat treatment; acid treatment; alkali treatment; enzyme treatment; chemical modification; denaturation and/or renaturation by chemical and/or physical treatments including heat treatment, acid treatment, alkali treatment, enzyme treatment, chemical modification, etc.; removal of some ingredients by use of water and/or organic solvents; removal of some ingredients by filtration and/or centrifugation; freezing; pulverization; drying; sieving, etc., or non-defatted soybean after similar processing. These nitrogen sources may be used solely or in combination of a few of them. Common sources are soybean, defatted soybean, soybean flakes, soybean protein for foods, bean curd refuse, soy-milk, roasted and ground soybean, etc. of which heat-denatured defatted soybean is desirable, and it is more desirable to use defatted soybean after heat-denaturation followed by removal of ethanol-soluble ingredients.

In addition, inorganic salts such as phosphates, calcium chloride, magnesium chloride, magnesium sulfate, iron sulfate, copper sulfate, and sodium sulfate, and vitamins may be used as trace nutrients if necessary. These nutrients in the medium are not particularly restricted as far as each of them is contained at such a concentration that does not inhibit the growth of the microorganism. For practical purposes, the preferred concentration of the carbon source is 0.1 to 30% by weight, preferably 0.5 to 15% by weight, more preferably 1 to 15% by weight, while the preferred concentration of the nitrogen source is 0.01 to 10% by weight, preferably 0.1 to 5% by weight. Spinner culture with aeration and agitation, shaking culture, or standing cululture is performed at temperatures of 5 to 40° C., preferably 20 to 30° C., in a medium of pH 4 to 10, preferably 5 to 8, usually for 2 to 20 days.

When a solid medium is used, wheat bran, hull chaff, rice bran, or the like to which 50 to 100% by weight of water has been added is used for incubation at temperatures of 5 to 40° C. preferably 20 to 30° C., for 3 to 20 days. Nitrogen sources, inorganic salts, and/or trace nutrients may be added to the medium as needed.

For increasing the amount of arachidonic acid produced, a hydrocarbon such as hexadecane or octadecane; a fatty acid such as oleic acid or linoleic acid or a salt thereof such as sodium or potassium salt, or a fatty acid ester such as ethyl ester, sorbitan fatty acid ester, glycerol fatty acid ester; or oils and fats such as olive oil, cotton seed oil, or coconut oil, may be added solely or in combination as a precursor of arachidonic acid. These additives may be added at a time, or continuously, or at several times in lots. Hydrocarbons, fatty acids or the salts thereof, or oils and fats are desirable when added before the start of culturing, while fatty acids or the salts thereof, or fatty, acid esters, or oils and fats are desirable when added during cultivation.

After cultivation under above-mentioned conditions, the arachidonic acid-containing lipid is produced and accumulated within the microbes. When a liquid culture medium was used, the arachidonic acid-containing lipid is recovered from the microbes as follows:

After culturing is complete, the microbes are collected from the culture medium by conventional solid-liquid separation means such as centrifugation and/or filtration, etc. The microbes thus collected are preferably washed with water, destroyed, and dried. The microbes are dried by freeze-drying, drying in air, etc. Dried microbes are subjected to extraction with an organic solvent preferably under nitrogen flow. Usable organic solvents include ether, hexane, methanol, ethanol, chloroform, dichloromethane, petroleum ether, etc. Alternate extraction with methanol and petroleum ether, and extraction with a one-layer solvent system consisting of chloroform, methanol, and water are also able to attain a good result. Evaporation of the organic solvent from the extract under reduced pressure gives an oil containing arachidonic acid at a high concentration.

Instead of the above-mentioned methods, wet microbes may be used for extraction. Solvents usable in this case include those that are soluble in water, such as methanol, ethanol, and the like, and water-soluble mixtures containing these solvents and water and/or other solvents. Other procedures are the same as mentioned above.

The arachidonic acid-containing lipid thus obtained contains mostly triglycerides (about 70% by weight or more) and phospholipids (about not more than 30% by weight), and in addition, unsaponifiable matters including desmosterol. The unsaponifiable matters contain substances of which structures remain unknown or which have not been recognized as food components, for example, sterol with cyclopropane structure which have not been recognized as food components, specifically, 24,25-methylenecholest-5-en-3 β-ol.

The oil of this invention can be produced by refining the arachidonic acid-containing oil obtained by cultivation of the above-mentioned arachidonic acid-producing microorganisms belonging to the subgenus Mortierella of the genus Mortierella. That is, once the type of fats to be treated and the substances to be removed have been decided, the unsaponifiable matters containing sterol with cyclopropane structure and substances of which structures remain unknown can be removed with an appropriate combination of common methods for refining of edible oils and fats, such as degumming, refining with alkali, bleaching, deodorization, etc., without any influence on the content of arachidonic acid, from the arachidoninc acid-containing oil obtained by cultivation of the above-mentioned microorganisms belonging to the genus Mortierella and being capable producing arachinonic acid.

For refining, column chromatography is employed in this invention. Activated alumina, active carbon, molecular sieves, silica gel, activated clay, diatomaceous earth, silver-silica gel, and/or ion exchange resins are used in this invention. The above-mentioned arachidonic acid-containing oil are refined by using the gel as the packing material. Namely, the above-mentioned arachidonic acid-containing oil and an organic solvent such as hexane, ethanol, supercritical fluid, etc., which is used as a developer, are forced to flow solely or as a mixture thereof at a constant rate through the column packed with the gel so that unsaponifiable matters and the refined oil may be developed and eluted. Chromatography may be performed by the Simulated moving bed chromatography.

After removal of the organic solvent by distillation, etc., the residue is treated further with steam distillation. Namely, steam distillation can remove even trace volatile flavor compounds and unsaponifiable matters having the low boiling points. Also a trace amount of the remaining organic solvent left behind after the chrohgatographic process can be eliminated at the same time. Thus an edible oil composition that contains arachidonic acid and is essentially free of unsaponifiable matters is obtained. Column chromatography may be combined with another well-known method for refining, in addition to steam distillation or fractional distillation with a supercritical fluid.

Because of the low content of 24,25-methylenecholest-5-en-3 β-ol that has not been recognized as food component, the arachidonic acid-containing oil of this invention can be used as an ingredient of foods. The type of foods is not particularly restricted, being exemplified by foods containing oils and fats, including natural foods containing oils and fats, such as meat, fish, and nuts; foods to which oils and fats are added during cooking, such as Chinese dishes, Chinese noodle, soup, etc.; foods which use oils and fats as the heat transfer medium, such as tempura, fry, fried bean curd, Chinese dish of fried rice, doughnuts, fried dough cakes, etc.; fatty foods and processed foods with oils and fats added during processing, such as butter, margarine, mayonnaise, dressing sauce, chocolate, instant Chinese noodle, caramel, biscuit, ice cream, etc.; and foods with oils and fats sprayed or applied during finishing, such as fried rice case, hard biscuit, bean jam bun, etc. However foods are not restricted to those containing oils and fats, but agricultural foods such as bread, noodles, rice, confectionery, soybean curd and processed soybean curd; fermentation foods such as sake, medical sake, sweat sake (mirin), vinegar, miso, dressing, etc.; live-stock foods such as yoghurt, ham, bacon, sausage, mayonnaise, etc.; fishery foods such as fish paste, fried fish paste, fish paste containing grated yam; drinks such as fruit juice, fresh drinks, sports drinks, alcoholic drinks, tea, etc. may be included.

The oil of this invention are preferable as raw materials especially for formula for premature infants, formula for infants, foods for infants, and foods for pregnant women and nursing mothers, because the oil contain a low content of 24,25-methylenecholesth 5-ene3 β-ol which has not been recognized as food component, are rich in arachidonic acid in the form of a triglyceride, and are free of eicosapentaenoic acid or, even if so, contain only a trace amount of the acid.

Further, the oil of this invention may be used in functional foods including health foods for specified use (or health foods), and the form of these foods may be general ones, or capsules, granules, tablets, drinks, or enteric feeding forms.

BEST MODE FOR CARRYING OUT THE INVENTION

This invention will now be explained in more detail with reference to the following Examples. It should be noted that this invention is not limited at all by these Examples.

Inventive Example 1

*Mortierella alpina* CBS754.68 as the arachidonic acid-producing microorganism was inoculated in a 2000-1 culture tank with 1400 l of culture medium containing 2% of glucose, 1% of yeast extract, and 0.2% soybean oil, and culture with aeration and agitation was started at 28° C. with aeration at 1.0 vvm, agitation rate at 80 rpm, and the internal pressure of the tank of 1.0 kg/cm$^2$G. The concentration of glucose was maintained at 1.5% by the fed-batch system, and the microbes were collected by filtration after 7-day cultivation, to give 25 kg of dried microbes. Then 5 l of hexane was added to 1 kg of the dried microbes thus obtained, and the mixture was gently stirred for 30 minutes. Thereafter the filtrate obtained by suction filtration was subjected to evaporation in a rotary evaporator to remove the solvent, to give 590 g of a crude oil extract.

An open column was packed with 450 g of silica gel. The crude oil extract, 590 g, was diluted five times with hexane, and refined through the column, followed by evaporation of hexane, to give 450 g of a column-treated oil. The oil was subjected further to steam distillation for deodorization, followed by addition of 0.04% of tocopherol as an antioxidizing agent, to give a refined oil.

Comparative Example 1

Extraction was performed in the same manner as described in Example 1, but the extract was not treated with the column, followed by steam distillation for deodorization, to give a refined oil after addition of 0.04% of tocopherol.

[Quantification of Unsaponifiable Matters]

The refined oil obtained in Inventive Example 1 and that in Comparative Example 1 were each analyzed for the content of unsaponifiable matters by the following method. The results are shown in Table 1.

In this invention, the content of unsaponifiable matters means the residual amount after subtraction of the amount of contaminated fatty acids from the amount of the substance extracted with a solvent used in quantitative analysis after saponification of the oil in accordance with the method for quantification of unsaponifiable matters, which is specified in the Standard Methods for the Analysis of Fats, Oils and Related Materials by Japan Oil Chemists' Society, the residual amount being expressed by the percentage to the amount of the sample. The amount of the Unsaponifiable Matter added after refining, such as tocopherol, should be subtracted.

The above specified method will be outlined below (see "YUKAGAKU (Oil Chemistry)", Journal of Japan Oil Chemists' Society, 13, 489 (1996)):

Weigh about 5 g of a sample in a flask, add 50 ml of 1N-ehtanolic potassium hydroxide, and boil gently for 1 hour for saponification. Stop heating when saponification has completed, transfer the liquid after saponification into a separating funnel together with the washing of the saponification flask with 100 ml of warm water, add 50 ml of water, and allow the mixture to cool to the room temperature. Add 100 ml of ethyl ether to the separating funnel while washing the saponification flask with the ethyl ether, stopper tightly the funnel, shake vigorously for 1 minute, and stand it still until two layers are separated clearly. Transfer the lower layer into a second separating funnel, add 50 ml of ethyl ether, shake as did with the first funnel, stand it still, transfer the lower layer into a third funnel after separation into two layers, and repeat extraction similarly with 50 ml of ethyl ether.

Transfer the ethyl ether layers in the second and the third funnels into the first funnel while washing those funnels with a small amount of ethyl ether, add 30 ml of water, shake and then stand it still for separation into two layers, and remove the lower layer. Repeat the process of shaking and standing-still for fractionation with 30 ml of water added each time, and wash the extracts until the fractionated water no longer shows color with the phenolphthalein indicator. Dehydrate the washed ethyl ether extract with sodium sulfate (anhydrous) as needed, filtrate it through a dry filter paper, transfer the filtrate into a distillation flask. The containers, the filter papers, etc. used for extraction are each washed with a small amount of ethyl ether, and the washings are all added to the distillation flask. Remove ethyl ether in the distillation flask by distillation, cool when the volume has become about 50 ml, and transfer the concentrated ethyl ether extract into an accurately weighed 100-ml round bottomed flask together with the washing of the distillation flask with a small amount of ethyl ether.

Distillate off almost completely ethyl ether in the round bottomed flask, add 3 ml of acetone, most of which is distillated off similarly as in the preceding process, heat the extract to 70 to 80° C. for 30 minutes under a slightly reduced pressure (about 200 mmHg), place the round bottomed flask into a vacuum desiccator, and stand it still for 30 minutes for cooling. Weigh accurately the round bottomed flask to calculate the weight of the extract.

Add and mix by shaking 2 ml of ethyl ether and 10 ml of neutral ethanol in the round bottomed flask to dissolve the extract, and determine the amount of contaminated fatty acids by titration with the N/10 ethanolic potassium hydroxide standard solution using the phenolphthalein indicator, wherein the endpoint is the pale red color of the indicator kept unchanged for 30 seconds.

$$\text{Unsaponifiable matters content } (\%) = \{A - (B \times F \times 0.0282)\}/C \times 100$$

$$\text{Contaminated fatty acids (on the oleic acid basis, g)} = B \times F \times 0.0282$$

wherein A=weight of the extract (g)

B=amount of N/10-ethanolic potassium hydroxide standard solution used (ml)

C=amount of the sample (g)

F=titer of N/10-ethanolic potassuium hydroxide standard solution

[Quantification of Arachidonic Acid]

The refined oil preparations obtained in Inventive Example 1 and Comparative Example 1 were used for preparation of fatty acid methyl esters in accordance with the method described below, and the esters were subjected to gas chromatography for determination of the content of arachidonic acid. The results are shown in Table 1.

TABLE 1

|  | Unsaponifiable matters content (%) | *heavy metals | 24,25-methylene cholest-5-en-3 β-ol content (%) | Arachidonic acid content (%) |
|---|---|---|---|---|
| Inventive Example 1 | 0.5 | Not detected | 0.26 | 38 |
| Comparative Example 1 | 1 | Not detected | 0.51 | 39 |

*detection limit: 0.5 ppm

Preparation of Methyl Esters 15 mg of the sample was weighed precisely, and converted into methyl esters by treatment with absolute methanol-hydrochloric acid (95:5) at 50° C. for 3 hours. The resultant fatty acid methyl esters were extracted completely with hexane, and subjected to gas chromatography under the following conditions.

Column
Liquid phase: Advance-DS 5%
Support: Chromosorb W (AW-DMCS)
Grain size: 80 to 100 mesh
Size: inner diameter 3 mm×2.1 m
Carrier gas: nitrogen 60 mL/m
Detector: FID
Column temperature: 190° C.
Detector temperature: 250° C.
Injection port temperature: 240° C.

[Quantification of 24,25-methylenecholest-5-en-3 β-ol]

The refined oil preparations obtained in Inventive Example 1 and Comparative Example 1 were subjected to quantification of 24,25-methylenecholest-5-en-3 β-ol. The results are shown in Table 1.

First, the process for sterol composition analysis is explained: Weigh 30 to 80 mg of the starting oil into a test tube with a stopper, add 4 ml of methanol and 1 ml of 33% aqueous solution of potassium hydroxide, and close the tube with the stopper. Allow the mixture to react with gentle stirring at 80° C. for 1 hour, allow it to stand for cooling, and extract fat-soluble components with hexane. Wash the resultant hexane solution with water until the aqueous layer no longer shows color with the phenolphthalein indicator, and concentrate the solution under reduced pressure to give a sample for analysis. Dissolve the sample in a small amount of hexane, and subject the solution to gas chromatography under the conditions described below. Use commercially available cholesterol as the internal standard, and calculate the ratio of the weight to that of the starting oil based on the assumption that the ratio of FID detected area/detected weight is the same for all sterols. The calculated ratio is defined as the content of 24,25-methylenecholest-5-en-3 β-ol.

Conditions of gas chromatography
Column: ULBON HR-1 (inner diameter 0.25 mm, length 25 mn)
Column temperature: 280° C.
Injection port and detector temperature: 300° C.
Carrier gas and gauge pressure: helium 1.2 kg/cm²
Make-up gas and flow rate: nitrogen 70 ml/min.
Detector: FID
Split ratio: 20

Inventive Example 2

*Mortierella alpina* CBS527.72, *Mortierella alpina* ATCC42430, *Mortierella hygrophila* IFO5941, and *Mortierella elongata* IFO8570, as arachidonic acid-producing microorganisms, were cultivated separately. 600 liter of a culture medium containing 4% of glucose, 1% of yeast extract, and 0.2% soybean oil was placed in a 1000-1 tank, and culture with aeration and agitation was performed for 7 days at 28 ° C. with aeration at 1.0 vvm, agitation rate at 100 rpm, and the internal pressure of the tank of 0.5 kg/cm²G. Dried microbes were obtained after filtration and drying.

The dried microbes thus obtained were treated in the same manner as described in Inventive Example 1 and Comparative Example 1. The resultant refined oil preparations were analyzed for the content of unsaponifiable matters, the content of 24,25-methylenecholest-5-en-3 β-ol, and the content of arachidonic acid.

The results are shown in Table 2.

It was found that treatment in a column can produce a refined oil preparation with a low content of 24,25-methylenecholest-5-en-3 β-ol, while keeping the content of arachidonic acid unaffected.

TABLE 2

| Strain | | Unsaponifiable matters content (%) | 24,25-methylene cholest-5-en-3 β-ol content (%) | Arachidonic acid content (%) |
|---|---|---|---|---|
| M.alpina CBS527.72 | Inventive Example | 0.6 | 0.22 | 33 |
| M.alpina CBS527.72 | Comparative Example | 1.6 | 0.62 | 33 |
| M.alpina ATCC42430 | Inventive Example | 0.3 | 0.11 | 26 |
| M.alpina ATCC42430 | Comparative Example | 0.9 | 0.33 | 27 |
| M.hygrophila 1FO5941 | Inventive Example | 0.5 | 0.15 | 23 |
| M.hygrophila 1FO5941 | Comparative Example | 1.6 | 0.52 | 22 |
| M.elongata 1FO8570 | Inventive Example | 0.4 | 0.23 | 21 |
| M.elongata 1FO8570 | Comparative Example | 1 | 0.58 | 21 |

Inventive Example 3

*Mortierella alpina* CBS754.68 as the arachidonic acid-producing microorganism was inoculated in a 2000-1 culture tank along with 1400 l of a culture medium containing 2% of glucose, 1% of yeast extract, and 0.1% soybean oil, and culture with aeration and agitation was started at 24° C. with aeration at 0.5 vvm, agitation rate at 100 rpm, and the internal pressure of the tank of 1.0 kg/cm²G. The concentration of glucose was maintained at 1.5% by fed-batch system, and the microbes were collected by filtration after 9-day cultivation, to give 20 kg of dried microbes. 15 Liter of hexane was added to 3 kg of the dried microbes thus obtained, and the mixture was gently stirred for 30 minutes. Then the filtrate obtained by suction filtration was subjected to evaporation in a rotary evaporator to remove the solvent, to give 1800 g of a crude oil extract.

1000 Gram of the crude oil extract was treated in a column as described in Inventive Example 1, to give 900 g of a column-treated oil. 500 Gram of the column-treated oil and 800 g of the crude oil extract were subjected to distillation for removal of unsaponifiable matters.

The column-treated oil, distillation-treated oil, and column-distillation-treated oil were separately deodorized by steam distillation, and 0.04% of tocopherol was added as an anti-oxidizing agent. The resultant refined oil preparations were analyzed for the content of unsaponifiable matters, the content of 24,25-methylenecholest-5-en-3 β-ol, and the content of arachidonic acid.

The results are shown in Table 3.

It was proved that column-treatment and/or distillation can produce refined oil preparations with a low content of 24,25-methylenecholest-5-en-3 β-ol, while keeping the content of arachidonic acid unaffected.

TABLE 3

| Treatment | Unsaponifiable matters content (%) | 24,25-methylenecholest-5-en-3 β-ol content (%) | Arachidonic acid content (%) |
|---|---|---|---|
| Column treatment → deodorization | 0.38 | 0.14 | 42 |
| Distillation → deodorization | 0.4 | 0.15 | 41 |
| Column treatment → distillation → deodorization | 0.36 | 0.13 | 43 |

Inventive Example 4

Cultivation was performed in the same manner as described in Inventive Example 1 and Comparative Example 1 except that 1% of soybean protein (Trade Name: Esusan Meat, Ajinomoto Co., Inc.) was used in place of yeast extract. The oil preparations obtained were analyzed for the content of unsaponifiable matters, the content of 24,25-methylenecholest-5-en-3 β-ol, and the content of arachidonic acid after the same treatment as described in Inventive Example 1 and Comparative Example 1. The results are shown in Table 4.

TABLE 4

| | Unsaponifiable matters content | 24,25-methylenecholest-5-en-3 β-ol content | Arachidonic acid content |
|---|---|---|---|
| Inventive Example 4 | 0.5% | 0.09% | 37% |
| Comparative Example 4 | 1.1% | 0.20% | 37% |

Inventive Example 5

*Mortierella alpina* ATCC 32221 as the arachidonic acid-producing microorganism was inoculated in a 50-l culture tank along with 25 l of a culture medium containing 4% of glucose, 1.2% of defatted soybean powder, 0.2% potassium hydrogen phosphate, and 0.1% of soybean oil, and culture with aeration and agitation was performed for 5 days at 28° C. with aeration at 1.0 vvm, agitation rate at 300 rpm, and the internal pressure of the tank of 1.0 kg/cm$^2$G. Arachidonic acid-containing microbes were collected by filtration and drying. The microbes thus obtained were treated in the same manner as described in Inventive Example 1 and Comparative Example 1, and the resultant oil preparations were analyzed for the content of unsaponifiable matters, the content of 24,25-methylenecholest-5-en-3 β-ol, and the content of arachidonic acid. The results are shown in Table 5.

TABLE 5

| | Unsaponifiable matters content | 24,25-methylenecholest-5-en-3 β-ol content | Arachidonic acid content |
|---|---|---|---|
| Inventive Example 5 | 0.5% | 0.02% | 25% |
| Comparative Example 5 | 0.9% | 0.05% | 25% |

What is claimed is:

1. Arachidonic acid-containing edible oil originating in microorganisms comprising not more than 0.8% by weight of unsaponifiable matters and 20% by weight or more of arachidonic acid.

2. Arachidonic acid-containing edible oil originating in microorganisms as claimed in claim 1, wherein the content of unsaponifiable matters is not more than 0.6% by weight.

3. Arachidonic acid-containing edible oil originating in microorganisms as claimed in claim 1 or claim 2, wherein the unsaponifiable matters comprise 24,25-methylenecholest-5-en-3 β-ol and wherein the content of 24,25-methylenecholest-5-en-3 β-ol is not more than 0.15% by weight.

4. Arachidonic acid-containing edible oil originating in microorganisms as claimed in claim 3, wherein the unsaponifiable matters comprise 24,25-methylenecholest-5-en-3 β-ol and wherein the content of 24,25-methylenecholest-5-en-3 β-ol is not more than 0.15% by weight.

5. A food comprising arachidonic acid-containing edible oil as claimed in claim 1 or claim 2 and at least one other edible ingredient.

* * * * *